United States Patent [19]

Igarashi

[11] Patent Number: 5,418,649
[45] Date of Patent: May 23, 1995

[54] OBJECTIVE LENS SYSTEM FOR ENDOSCOPES

[75] Inventor: Tsutomu Igarashi, Tokyo, Japan

[73] Assignee: Olympus Optical Co., Ltd., Tokyo, Japan

[21] Appl. No.: 52,748

[22] Filed: Apr. 27, 1993

[30] Foreign Application Priority Data

Apr. 28, 1992 [JP] Japan .................. 4-134430

[51] Int. Cl.$^6$ ............................................. G02B 13/18
[52] U.S. Cl. ...................... 359/716; 359/740; 359/784
[58] Field of Search ............... 359/708, 713–716, 359/761–762, 770, 781–784, 739, 740

[56] References Cited

U.S. PATENT DOCUMENTS

| 5,087,989 | 2/1992 | Iganashi | 359/708 |
| 5,175,650 | 12/1992 | Takayama et al. | 359/716 |
| 5,223,982 | 6/1993 | Suzuki et al. | 359/716 |

FOREIGN PATENT DOCUMENTS

| 65-55308 | 4/1980 | Japan . |
| 57-64207 | 4/1982 | Japan . |
| 57-173810 | 10/1982 | Japan . |
| 2-69710 | 3/1990 | Japan . |
| 2-208617 | 8/1990 | Japan . |

*Primary Examiner*—Loha Ben
*Assistant Examiner*—James Phan
*Attorney, Agent, or Firm*—Cushman, Darby & Cushman

[57] ABSTRACT

An objective lens system for endoscopes comprising, in order from the object side, a first lens unit having a negative refractive power, an aperture stop, a second lens unit having a positive refractive power and a third lens unit having a positive refractive power, and using an aspherical surface adopted as an image side surface of the second lens unit or an object side surface of the third lens unit. The objective lens system is of a nearly telecentric retrofocus type, composed of a small number of lens elements and compact.

8 Claims, 9 Drawing Sheets

OBJECTIVE LENS SYSTEM FOR ENDOSCOPES

BACKGROUND OF THE INVENTION a) Field of the Invention

The present invention relates to a nearly telecentric retrofocus type objective lens system which is to be used in fiber scopes and video scopes.

b) Description of the Prior Art

Known as conventional examples of retrofocus type objective lens systems for endoscopes are the lens systems which are described below:

The objective lens system disclosed by Japanese Patent Kokai Publication No. Sho 55-55,308, for example, consists, in order from the object side, of a negative lens unit, an aperture stop, a positive lens unit and a cemented lens unit, or is composed as a whole of four lens elements. This conventional example is configured so as to correct chromatic aberration and spherical aberration by using the cemented lens unit. However, this objective lens system forms images which are not so bright and allows spherical aberration to remain at least on the order of 5% of a focal length of the lens system as a whole when it is specified for F/3.5. It is difficult to configure this type of objective lens system so as to form bright images by reducing the F number thereof.

Further, the objective lens system disclosed by Japanese Patent Kokai Publication No. Sho 57-64,207, is configured so as to correct aberrations when it has a wide field angle and has spherical aberration which is corrected rather favorably, but requires a high manufacturing cost due to a fact that the lens system comprises five or six lens elements.

Furthermore, Japanese Patent Kokai Publication No. Hei 2-69,710 discloses, as certain embodiments thereof, objective lens systems each of which consists of a negative lens unit, an aperture stop and a positive lens unit. Each of the lens systems preferred as the above-mentioned embodiments consists of three lens elements, but has an F number of 3 or larger, forms dark images and allows negative spherical aberration to remain therein, whereby the lens system can hardly form bright images or have an aperture larger than F3.

As is understood from the foregoing description, each of the conventional telecentric retrofocus type objective lens systems has a common defect that the lens systems form dark images with large F numbers or that the lens systems comprise large numbers of lens elements.

Moreover, there is known no retrofocus type objective lens system for endoscopes which has a numerical aperture enlarged by using an aspherical surface though objective lens systems using aspherical surfaces are known to those skilled in the art.

SUMMARY OF THE INVENTION

A primary object of the present invention is to provide a nearly telecentric retrofocus type objective lens system for endoscopes which has favorably corrected curvature of field, comprises a small number of lens elements and can form bright images.

The objective lens system for endoscopes according to the present invention has a fundamental composition which is illustrated in FIG. 1.

Speaking concretely, the objective lens system for endoscopes according to the present invention consists, in order from the object side, of a first lens unit I having a negative refractive power, an aperture stop S, a second lens unit II having a positive refractive power and a third lens unit III having a positive refractive power, uses an aspherical surface as an image side surface of the second lens unit or as an object side surface of the third lens unit, and is configured so as to satisfy the following conditions (1), (2) and (3):

$$0.4 < |f_{23}/f_1| < 2 \tag{1}$$

$$0.8 < |f_3/f_2| < 4 \tag{2}$$

$$E_i'(n_{i-1} - n_i) > 0 \tag{3}$$

wherein the reference symbol $f_{23}$ represents a total focal length of the second lens unit II and the third lens unit III, the reference symbols $f_1$, $f_2$ and $f_3$ designate focal lengths of the first lens unit I, the second lens unit II and the third lens unit III respectively, the reference symbol $E_i'$ denotes an aspherical surface coefficient of the fourth order of the aspherical surface, and the reference symbols $n_{i-1}$ and $n_i$ represent refractive indices of media located on the object side and the image side respectively of the aspherical surface.

Since the objective lens system for endoscopes according to the present invention uses the aspherical surface as described above, an expression of aspherical surfaces adopted in the present invention will be described below:

In embodiments of the present invention, aspherical surfaces are expressed by using the following formula (a):

$$x = \frac{y^2/r_i}{1 + \sqrt{1 - P(y/r_i)^2}} + B_i y^2 + E_i y^4 + F_i y^6 + G_i y^8 + \tag{a}$$

wherein the reference symbols x and y represent coordinates values on a system of coordinates on which an optical axis is taken as the x axis, regarding the direction toward an image as positive, a direction perpendicular to the optical axis is taken as the y axis, and an intersection between the aspherical surface and the optical axis is taken as an origin. Further, the reference symbol $r_i$ represents a radius of curvature as measured at a vertex of a quadratically curved surface, the reference symbol p designates a conical constant, and the reference symbols $B_i$, $E_i$, $F_i$, $G_i$, . . . denote the aspherical surface coefficients of the second, fourth, sixth, eighth, . . . orders respectively.

The above-mentioned formula (a) has high freedom and is suited for expressing axially symmetrical surfaces, but is unsuited for description according to the aberration theory. For describing a function of the aspherical surface to be used in the objective lens system for endoscopes according to the present invention, it is preferable to express a shape of the aspherical surface by the following formula (b):

$$x = \frac{y^2/r_i'}{1 + \sqrt{1 - (y/r_i')^2}} + E_i' y^4 + F_i' y^6 + G_i' y^8 + \tag{b}$$

wherein the reference symbol $r_i'$ represents a radius of curvature on a reference sphere of the aspherical surface (a spherical surface which is in contact with the aspherical surface at a vertex thereof), and the reference symbols $E_i'$, $F_i'$, $G_i'$, . . . designate aspherical surface coefficients which are obtained by transforming the formula (a) into the formula (b). The formula (a) can be transformed into the formula (b) by using Taylor expansion A transformation formula (c) for $r_i'$ and aspherical surface coefficients down to the twelfth order are shown below (the formulae shown below will hereinafter be referred collectively as the formula (c)):

$r_i' = r_i/(1+2B_i r_i)$ $E_i' = 0.125 \{P_i - (1+2B_i r_i)^3\}/r_i^3 + E_i$ $F_i' = 0.0625 \{P_i^2 - (1+2B_i r_i)^5\}/r_i^5 + F_i$ $G_i' = 0.0390625\{P_i^3 - (1+2B_i r_i)^7\}/r_i^7 + G_i$ $H_i' = 0.02734375\{P_i^4 - (1+2B_i r_i)^9\}/r_i^9 + H_i$ $I_i' = 0.02050782\{P_i^5 - (1+2B_i r_i)^{11}\}/r_i^{11} + I_i$

In the formula (c) shown above, the first term in the right side of the formula expressing each of the aspherical surface coefficients $E_i'$, $F_i'$, ... has been obtained by performing Taylor expansion of the term which expresses the quadratically curved surface. Since the formulae obtained by the expansion express infinite series, the formulae comprising only finite orders provide approximations. However, formulae comprising the coefficients down to the twelfth order can ordinarily provide good approximations and the formula (c) contains calculation formulae using the coefficients down to the twelfth order only. When $P_i$ is equal to 1 and $B_i$ is equal to 0 in the formula (a), in addition, it is unnecessary to transform the abovementioend aspherical surface coefficients since $r_i$ is equal to $r_i$, $E_i'$ is equal to $E_i$, $F_i'$ is equal to $F_i$, $G_i'$ is equal to $G_i$, ...

In order to compose the objective lens system for endoscopes according to the present invention of four or less lens elements, a front subsystem which is disposed before the aperture stop is composed only of the single lens unit having the negative refractive power and a rear subsystem disposed after the aperture stop is composed of the two lens units having the positive refractive powers as illustrated in FIG. 3 through FIG. 6 so as to reserve the required positive refractive power. Further, it is necessary to dispose a lens element having a negative refractive power in the objective lens system for correcting curvature of field, but freedom in selection of power distributions is narrowed by reducing a number of lens elements. For this reason, it is desirable to dispose the lens unit having the negative refractive power (the front subsystem) before the aperture stop so that the objective lens system as a whole has a short focal length for obtaining a wide field angle. Further, the rear subsystem is divided into the two lens units so as to compose the lens units of a minimum number of lens units for obtaining a large numerical aperture while maintaining the telecentric characteristic. If the rear subsystem is composed only of a single lens unit, too heavy a burden of refractive power will be imposed on this lens unit, thereby forcing it to sacrifice the maintainance of the telecentric characteristic or the correction of aberrations even when an aspherical surface is used. Furthermore, it is undesirable to compose the rear subsystem of three lens units since such a composition inevitably increases a number of lens elements to be disposed in the rear subsystem.

The above-mentioned condition (1) is required for maintaining curvature of field as small as possible. A petzval's sum which is used for judging corrected condition of curvature of field is a sum of quotients of a refractive power of each lens surface divided by a difference between refractive indices of media on the object side and the image side of the surface. Since lens surfaces having negative refractive powers are concentrated in the front subsystem and lens surfaces having positive refractive powers are concentrated in the rear subsystem in the objective lens system according to the present invention, the focal length $f_1$, of the first lens unit I is balanced with the total focal length $f \leq$ of the second lens unit II and the third lens unit III, whereby Petzval's sums having positive values and negative values are cancelled with each other and a Petzval's sum of the objective lens system as a whole is small enough to favorably correct curvature of field. It is therefore desirable that $|f_{23}/f_1|$ has a value close to 1 or within the range defined by the condition (1) in practice. If $\{f_{23}/f_1\}$ has a value smaller than 0.4, an image surface will be undesirably inclined toward the object side at high image height. If $|f_{23}/f_1|$ has a value larger than 2, in contrast, the image surface will undesirably be inclined in the direction reverse to the object side.

The condition (2) defines a power distribution for the rear subsystem which is optimum for facilitating correction of aberrations. Since the second lens unit has a role to change a diverging light bundle which has passed through the first lens unit into a converging light bundle, it is necessary to impart a strong positive refractive power to the second lens unit. Further, since remarkable coma and astigmatism are generally produced when a strong refractive power is imparted to a lens surface which largely refracts a principal ray, it is rather hard to impart a strong refractive power to a lens surface which largely refracts the principal ray. In the objective lens system according to the present invention, a lens surface which refracts the principal ray at a small angle and is concentric with the aperture stop in the rear subsystem is used as the image side convex surface of the second lens unit. Therefore, it is possible to obtain the required refractive power with no adverse influence on aberrations by imparting a strong positive power to the image side surface of the second lens unit. For this reason, it is desirable to select a power distribution in which the second lens unit has a refractive power equal or stronger than that of the third lens unit, or it is preferable to satisfy the condition (2). For the reason described above, it will undesirably be impossible to suppress coma and astigmatism produced in the third lens unit if $f_3/f_2$ has a value smaller than 0.8 in the condition (2). If $f_3/f_2$ has a value larger than 4, in contrast, too heavy a burden of refractive power will be imposed on the second lens unit, thereby undesirably making it impossible to suppress the production of coma and astigmatism with the second lens unit.

The condition (3) defines a shape of the aspherical surface, or is required for favorably correcting spherical aberration, coma, etc. with the aspherical surface. An aspherical surface exhibits a merit thereof for correcting aberrations other than chromatic aberration and curvature of field. The objective lens system according to the present invention is configured so as to correct, with the aspherical surface, the aberrations which remain in amounts which are increased when lens elements are used in a smaller number. For correcting the residual aberrations, it is necessary to know detailed conditions of aberrations which remain in an objective lens system which uses no aspherical surface. In a lens system which is nearly telecentric, like the objective lens system according to the present invention, and comprises no lens component such as a cemented lens component having a function to cancel aberrations produced by a lens system, spherical aberration, coma (inner coma), negative astigmatism (tilting of the meridional image surface relative to the saggital image surface toward the object side) generally remain. In order to correct these residual aberrations, it is sufficient to produce these aberrations having positive values with the aspherical surface. For this purpose, it is sufficient to select a shape described below for the aspherical surface. Relationship between $E_i'$ used in the above-mentioned formula of aspherical surface and the coefficients of the third order of aberrations which are produced by using the aspherical surface in place of a spherical surface are expressed by the following formulae (d), (e) and (f):

$$\Delta SA_i = 8h_i^4 \cdot E_i' (n_{i-1} - n_i) \quad (d)$$

$$\Delta CM_i = 8h_i^3 h_{Pi} E_i' (n_{i-1} - n_i) \quad (e)$$

$$\Delta AS_i = 8h_i^2 h_{Pi}^2 \cdot E_i' (n_{i-1} - n_i) \quad (f)$$

wherein the reference symbols $\Delta SA_i$, $\Delta CM_i$ and $\Delta AS_i$ represent the coefficients of the third order of spherical aberration, coma and astigmatism respectively produced due to the coefficient of the fourth order of the aspherical surface, the reference symbol $h_i$ designates a height of a paraxial marginal ray on the aspherical surface, and the reference symbol $h_{Pi}$ denotes a height of a paraxial principal ray on the aspherical surface.

As is understood from the formulae (d), (e) and (f), influence on the different types of aberrations (spherical aberration, coma and astigmatism) are different dependent on locations of the aspherical surface since $h_i$ and $h_{Pi}$ have different powers. In the objective lens system according to the present invention, the paraxial marginal ray is always on the same side relative to the optical axis and $h_i$ is always negative. On the other hand, the paraxial principal ray crosses the optical axis at a center of the aperture stop, and $h_i$ has signs which are reverse to each other before and after the aperture stop, i.e., $h_i$ is negative before the aperture stop and positive after the aperture stop. Signs of $\Delta SA_i$, $\Delta CM_i$ and $\Delta AS_i$ which are calculated on the basis of the signs of $h_i$ and $hPi$ are the signs of the aberrations which are to be produced by the aspherical surface. In order to obtain a positive value of $\Delta SA_1$ by using the aspherical surface in the front subsystem, it is necessary that $E_i'(n_{i-1}-n_i)$ has a positive value. In this case, however, $\Delta CM_i$ has a negative value, whereby residual coma will undesirably be aggravated by the aspherical surface. When the aspherical surface is disposed in the rear subsystem and $E'(-n_{i-1}-n_i)$ has a positive value, all of $\Delta SA_i$, $\Delta CM_i$ and $\Delta AS_i$ have positive values, whereby it is possible to cancel the residual aberrations (spherical aberration, coma and astigmatism which remain when the aspherical surface is not disposed) with the aberrations produced by disposing the aspherical surface.

For the reason described above, the objective lens system according to the present invention adopts the aspherical surface which is disposed in the rear subsystem and is configured so as to satisfy the condition (3). If the aspherical surface does not satisfy the condition (3), the aberrations will undesirably be aggravated by the function of the aspherical surface.

For efficiently correcting spherical aberration and coma which are largely influenced by enlarging a numerical aperture, it is desirable that the aspherical surface to be disposed in the rear subsystem is used as a surface on which marginal rays are high and which has a strong positive power producing aberrations in large amounts. It is most desirable to use the aspherical surface as the image side surface of the second lens unit or it is preferable to adopt the aspherical surface as the object side surface of the third lens unit.

The function to correct the aberrations can be obtained by configuring the aspherical surface so as to satisfy the condition (3) as described above. Further, it is desirable to satisfy the following condition (4) when amounts of aberrations to be corrected are taken into consideration:

$$0.001 < E_i'(n_{i-1} - n_i) \cdot f^3 < 0.2 \quad (4)$$

wherein the reference symbol f represents a focal length of the objective lens system as a whole.

If the lower limit of the condition (4) is exceeded, the aspherical surface will have too low a function to correct the aberrations or it will be difficult to obtain a sufficient effect for correcting the aberrations with the aspherical surface. If the upper limit of the condition (4) is exceeded, in contrast, the aspherical surface will have too high a function, whereby spherical aberration and coma will be overcorrected.

Further, when the aspherical surface is to be used as the image side surface of the second lens unit, it is more desirable that the coefficient of the sixth order $F_i'$ satisfies the following condition (5):

$$F_i'(n_{i-1} - n_i) > 0 \quad (5)$$

Since the image side surface of the second lens unit has the strong refractive power as described above, not only aberrations of the third order but also aberrations of the fifth order produced by the spherical surface are largely influenced. When the aspherical surface coefficient of the sixth order $F_i'$ producing the influences on the aberrations of the fifth order satisfies the abovementioned condition (5), the residual negative aberrations of the fifth order produced by the above-mentioned surface can be cancelled or corrected with the positive aberrations of the fifth order produced by the aspherical surface. If the above-mentioned condition (5) is not satisfied, it will undesirably be difficult to correct the aberrations of the fifth order.

The above-mentioned condition (3) defines the sign of the aspherical surface coefficient $F_i'$. When a paraxial radius of curvature of the aspherical surface is represented by $r'$, however x expressed by the formula of aspherical surface (b) from which the first term thereof is omitted has a value equal to that of $\Delta x(y)$ expressing a departure of the aspherical surface from a reference sphere thereof, $\Delta x(y)$ which can be used in place of $F_i'$ is defined as follows:

$$\Delta x(y) = E_i' y^4 + F_i' y^6 + G_i' y^8 + \ldots \quad (g)$$

Since all the powers of y are even numbers in the above-mentioned formula (g), the sign of the aspherical surface coefficient is the same as that of the departure of $\Delta x(y)$ caused by the influence due to the aspherical surface coefficient. Therefore, it is possible to define $\Delta x(y)$ by using the following condition (6) in place of the condition (3):

$$\Delta x(y)\{n_{i-1}-n_i\}>0 \qquad (6)$$

The above-mentioned $\Delta x(y)$ is a function of y which is a distance as measured from the optical axis. In order to accomplish the primary object of the present invention or correct spherical aberration, it is necessary to satisfy the above-mentioned condition (6) at a point of $y=h_M$ wherein the reference symbol $h_M$ represents a height of a marginal ray (a ray coming from a point located on the optical axis and passing through a marginal portion of the aperture stop) on the aspherical surface. It is therefore possible to use the following condition (7) in place of the condition (3):

$$\Delta x(h_M)\cdot\{n_{i-1}-n_i\}>0 \qquad (7)$$

As is already described above, the objective lens system for endoscopes according to the present invention consists of the first negative lens unit, the aperture stop, the second positive lens unit and the third positive lens unit, uses the aspherical surface as the image side surface or the object side surface of the third lens unit, and satisfies the above-mentioned conditions (1), (2) and (3).

In the next place, it is desirable for the objective lens system according to the present invention that the first lens unit is composed of a single lens element, the second lens unit is composed of a single lens element, the third lens unit is composed of a single lens element or a cemented lens component and a positive refractive power is imparted to the object side surface of the third lens unit.

Though it is possible to compose each of the lens units of a single lens element or a cemented lens component, it is desirable for reducing a number of lens elements to be disposed in the lens system to compose each of the first lens unit and the second lens unit of a single lens element. Further, when a cemented lens component is to be used for correcting chromatic aberration in the objective lens system, it is desirable to compose the third lens unit of a cemented lens component.

When the first lens unit is composed of a single lens element, it is desirable for suppressing production of lateral chromatic aberration as little as possible to select a glass material having an Abbe's number of 40 or larger for the lens element.

When the second lens unit is to be composed of a single lens element, it is desirable for suppressing production of lateral chromatic aberration and longitudinal chromatic aberration as little as possible to select a glass material having an Abbe's number of 50 or larger for the lens element.

When the third lens unit is also to be composed of a single lens element, it is desirable to select a glass material having an Abbe's number of 50 or larger for the lens element for a reason which is similar to that described with reference to the second lens unit. When the third lens unit is to be composed of a cemented lens component, it is desirable for correcting lateral chromatic aberration and longitudinal chromatic aberration that the cemented lens component is composed of a positive lens element and a negative lens element, and the positive lens element has an Abbe's number which is 20 or more larger than that of the negative lens element. Since the object side surface of the third lens unit has a positive refractive power, it is further desirable for effective utilization of this refractive power that the positive lens element is disposed on the object side and the negative lens element is disposed on the image side.

Next, the image side surface of the first lens unit has the strong negative refractive power. When the principal ray is refracted at a large angle by this surface, too remarkable coma and astigmatism are produced and can hardly be corrected. In order to reduce amounts of these aberration to be produced, it is desirable to satisfy the following condition (8):

$$0.4<d_2/r_2<2.5 \qquad (8)$$

wherein the reference symbol $d_2$ represents a distance expressed in terms of air as measured from the image side surface of the first lens unit to the aperture stop and the reference symbol $r_2$ designates a radius of curvature on the image side surface of the first lens unit.

Since the principal ray is incident perpendicularly onto the image side surface of the first lens unit and coma or astigmatism is not produced when $d_2/r_2$ is equal to 1, $d_2/r_2=1$ is desirable. In practice, however, it is sufficient to satisfy the above-mentioned condition (8). If the condition (8) is not satisfied, symmetry of a light bundle refracted by the above-mentioned surface is remarkably degraded, and coma and astigmatism will be produced in large amounts.

Further, in order to make the objective lens system compact, it is desirable that the focal length $f_1$ of the first lens unit and the focal length $f_2$ of the second lens unit are short, or satisfy the following conditions (9) and (10):

$$|f_1/f|<2.3 \qquad (9)$$

$$f_2/f<3.5 \qquad (10)$$

If one of the conditions (9) or (10) mentioned above is not satisfied, the objective lens system will undesirably be large.

In order to configure the objective lens system according to the present invention so as to be nearly telecentric, it is desirable that a paraxial pupil magnification $\beta_E$ (a pupil magnification determined by tracing the paraxial principal ray) satisfies the following condition (11):

$$|\beta_E|>2.5 \qquad (11)$$

If the condition (11) is not satisfied, the principal ray will be inclined remarkably toward the image side, whereby an amount of the marginal ray will undesirably be small in case of fiber scopes or color shading will undesirably be produced in case of video scopes.

DETAILED DESCRIPTION OF THE PREFERRED EMBODIMENTS

Figure 1:
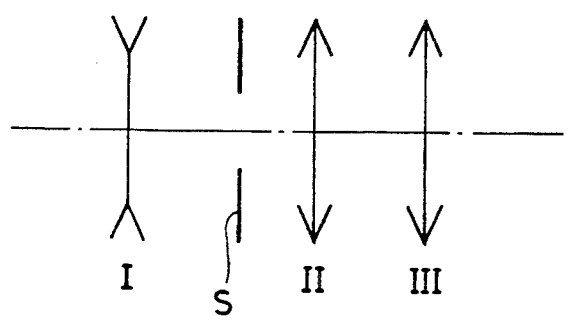
FIG. 1 shows a diagram illustrating a fundamental composition of the objective lens system for endoscopes according to the present invention.
Figure 2:
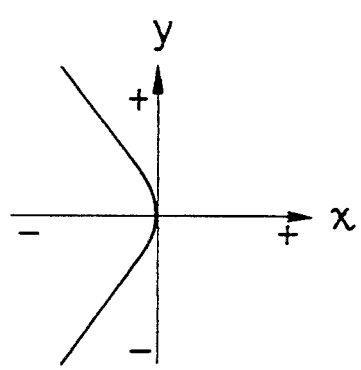
FIG. 2 shows a diagram illustrating a system of coordinates for the formula expressing aspherical surfaces.

Now, the objective lens system for endoscopes according to the present invention will be described in more detail below with reference to the embodiments illustrated in the accompanying drawings and given in the form of the following numerical data:

| Embodiment 1 |
|---|
| f = 1.000, F number = 1.994 |
| image height = 0.8926, field angle = 120° |
| object distance = −21.4231 |

| | | | |
|---|---|---|---|
| $r_1 = \infty$ | | | |
| | $d_1 = 0.4166$ | $n_1 = 1.51633$ | $\nu_1 = 64.15$ |
| $r_2 = 0.7353$ | | | |
| | $d_2 = 0.7457$ | | |
| $r_3 = \infty$ (stop) | | | |
| | $d_3 = 0.0357$ | | |
| $r_4 = 5.7842$ | | | |
| | $d_4 = 1.4380$ | $n_2 = 1.56384$ | $\nu_2 = 60.69$ |
| $r_5 = -1.0991$ (aspherical surface) | | | |
| | $d_5 = 0.4397$ | | |
| $r_6 = 2.0985$ | | | |
| | $d_6 = 2.9356$ | $n_3 = 1.56873$ | $\nu_3 = 63.16$ |
| $r_7 = \infty$ | | | |

| aspherical surface coefficients |
|---|
| P = 0.2558, B = 0, E = 0, F = 0, G = 0, H = 0, I = 0 |
| $E_i' = 7.006 \times 10^{-2}$, $F_i' = 3.642 \times 10^{-2}$ |
| $G_i' = 1.982 \times 10^{-2}$, $H_i' = 1.163 \times 10^{-2}$ |
| $I_i' = 7.245 \times 10^{-3}$ |
| $f_1/f = -1.424$, $f_2/f = 1.772$ |
| $E_i' (n_{i-1} - n_i) \cdot f^3 = 0.03950$, |
| $F_i' (n_{i-1} - n_i) \cdot f^5 = 0.02053$ |
| $\Delta x(h_M)\{n_{i-1} - n_i\}/f = 0.00387$, $d_2/r_2 = 1.014$ |
| $|f_{23}/f_1| = 0.944$, $f_3/f_2 = 2.082$, $|\beta_E| = 8.038$ |

| Embodiment 2 |
|---|
| f = 1.000, F number = 1.987 |
| image height = 0.8896, field angle = 120° |
| object distance = −21.3512 |

| | | | |
|---|---|---|---|
| $r_1 = \infty$ | | | |
| | $d_1 = 0.4152$ | $n_1 = 1.51633$ | $\nu_1 = 64.15$ |
| $r_2 = 0.8498$ | | | |
| | $d_2 = 0.7373$ | | |
| $r_3 = \infty$ (stop) | | | |
| | $d_3 = 0.0356$ | | |
| $r_4 = 3.7160$ | | | |
| | $d_4 = 1.4287$ | $n_2 = 1.56907$ | $\nu_2 = 71.30$ |
| $r_5 = -1.1339$ (aspherical surface) | | | |
| | $d_5 = 0.3451$ | | |
| $r_6 = 1.9791$ | | | |
| | $d_6 = 2.6253$ | $n_3 = 1.56873$ | $\nu_3 = 63.16$ |
| $r_7 = \infty$ | | | |

| aspherical surface coefficient |
|---|
| P = 0.0454, B = 0, E = 0, F = 0, G = 0, H = 0, I = 0 |
| $E_i' = 8.185 \times 10^{-2}$, $F_i' = 3.327 \times 10^{-2}$ |
| $G_i' = 1.621 \times 10^{-2}$, $H_i' = 8.825 \times 10^{-3}$ |
| $I_i' = 5.148 \times 10^{-3}$ |
| $f_1/f = -1.646$, $f_2/f = 1.709$ |
| $E_i' (n_{i-1} - n_i) \cdot f^3 = 0.04658$, |
| $F_i' (n_{i-1} - n_i) \cdot f^5 = 0.01894$ |
| $\Delta x(h_M)\{n_{i-1} - n_i\}/f = 0.00264$, $d_2/r_2 = 0.868$ |
| $|f_{23}/f_1| = 0.785$, $f_3/f_2 = 2.036$, $|\beta_E| = 7.241$ |

| Embodiment 3 |
|---|
| f = 1.000, F number = 1.980 |
| image height = 0.8925, field angle = 120° |
| object distance = −21.4194 |

| | | | |
|---|---|---|---|
| $r_1 = \infty$ | | | |
| | $d_1 = 0.4165$ | $n_1 = 1.51633$ | $\nu_1 = 64.15$ |
| $r_2 = 0.8342$ | | | |
| | $d_2 = 0.8475$ | | |
| $r_3 = \infty$ (stop) | | | |
| | $d_3 = 0.0357$ | | |
| $r_4 = 2.9160$ | | | |
| | $d_4 = 1.4155$ | $n_2 = 1.56907$ | $\nu_2 = 71.30$ |
| $r_5 = -1.1961$ (aspherical surface) | | | |
| | $d_5 = 0.4609$ | | |
| $r_6 = 2.0129$ | | | |
| | $d_6 = 2.5318$ | $n_3 = 1.56873$ | $\nu_3 = 63.16$ |
| $r_7 = \infty$ | | | |

| aspherical surface coefficient |
|---|
| P = 1.0000, B = 0, E = 0.46239 × 10$^{-1}$, F = 0.10882 |
| G = −0.16656 × 10$^{-1}$, H = 0, I = 0 |
| $f_1/f = -1.616$, $f_2/f = 1.703$ |
| $E_i' (n_{i-1} - n_i) \cdot f^3 = 0.02631$, |
| $F_i' (n_{i-1} - n_i) \cdot f^5 = 0.06193$ |
| $\Delta x(h_M)\{n_{i-1} - n_i\}/f = 0.00221$, $d_2/r_2 = 1.016$ |
| $|f_{23}/f_1| = 0.832$, $f_3/f_2 = 2.078$, $|\beta_E| = 7.090$ |

| Embodiment 4 |
|---|
| f = 1.000, F number = 2.010 |
| image height = 0.9745, field angle = 140° |
| object distance = −23.3877 |

| | | | |
|---|---|---|---|
| $r_1 = \infty$ | | | |
| | $d_1 = 0.4548$ | $n_1 = 1.51633$ | $\nu_1 = 64.15$ |
| $r_2 = 0.7923$ | | | |
| | $d_2 = 0.8152$ | | |
| $r_3 = \infty$ (stop) | | | |
| | $d_3 = 0.0390$ | | |
| $r_4 = 6.9121$ | | | |
| | $d_4 = 1.5708$ | $n_2 = 1.56384$ | $\nu_2 = 60.69$ |
| $r_5 = -1.1668$ (aspherical surface) | | | |
| | $d_5 = 0.2643$ | | |
| $r_6 = 2.1500$ | | | |
| | $d_6 = 3.1219$ | $n_3 = 1.56873$ | $\nu_3 = 63.16$ |
| $r_7 = \infty$ | | | |

| aspherical surface coefficient |
|---|
| P = 0.2270, B = 0, E = 0, F = 0, G = 0, H = 0, I = 0 |
| $E_i' = 6.083 \times 10^{-2}$, $F_i' = 2.741 \times 10^{-2}$ |
| $G_i' = 1.311 \times 10^{-2}$, $H_i' = 6.804 \times 10^{-3}$ |
| $I_i' = 3.756 \times 10^{-3}$ |
| $f_1/f = -1.534$, $f_2/f = 1.904$ |
| $E_i' (n_{i-1} - n_i) \cdot f^3 = 0.03430$, |
| $F_i' (n_{i-1} - n_i) \cdot f^5 = 0.01546$ |
| $\Delta x(h_M)\{n_{i-1} - n_i\}/f = 0.00331$, $d_2/r_2 = 1.029$ |
| $|f_{23}/f_1| = 0.891$, $f_3/f_2 = 1.985$, $|\beta_E|$ 8.304 |

| Embodiment 5 |
|---|
| f = 1.000, F number = 2.007 |
| image height = 0.8953, field angle = 120° |
| object distance = −21.4876 |

| | | | |
|---|---|---|---|
| $r_1 = \infty$ | | | |
| | $d_1 = 0.4178$ | $n_1 = 1.51633$ | $\nu_1 = 64.15$ |
| $r_2 = 0.7373$ | | | |
| | $d_2 = 0.7485$ | | |
| $r_3 = \infty$ (stop) | | | |
| | $d_3 = 0.0358$ | | |
| $r_4 = 5.7688$ | | | |
| | $d_4 = 1.4445$ | $n_2 = 1.69680$ | $\nu_2 = 55.52$ |
| $r_5 = -1.2596$ (aspherical surface) | | | |
| | $d_5 = 0.6504$ | | |
| $r_6 = 2.2026$ | | | |
| | $d_6 = 2.5770$ | $n_3 = 1.56873$ | $\nu_3 = 63.16$ |
| $r_7 = \infty$ | | | |

-continued

| aspherical surface coefficient |
|---|
| P = 0.1746, B = 0, E = 0, F = 0, G = 0, H = 0, I = 0 |
| $E_i' = 5.163 \times 10^{-2}$, $F_i' = 1.911 \times 10^{-2}$ |
| $G_i' = 7.723 \times 10^{-3}$, $H_i' = 3.423 \times 10^{-3}$ |
| $I_i' = 1.619 \times 10^{-3}$ |
| $f_1/f = -1.428$, $f_2/f = 1.620$ |
| $E_i' (n_{i-1} - n_i) \cdot f^3 = 0.03597$, |
| $F_i' (n_{i-1} - n_i) \cdot f^5 = 0.01332$ |
| $\Delta x(h_M)(n_{i-1} - n_i)/f = 0.00290$, $d_2/r_2 = 1.015$ |
| $|f_{23}/f_1| = 0.940$, $f_3/f_2 = 2.391$, $|\beta_E| = 7.870$ |

Embodiment 6 f = 1.029, F number = 2.027
image height = 0.8926, field angle = 120°
object distance = −21.4231

| | | | |
|---|---|---|---|
| $r_1 = \infty$ | | | |
| | $d_1 = 0.4166$ | $n_1 = 1.88300$ | $\nu_1 = 40.78$ |
| $r_2 = 1.1761$ | | | |
| | $d_2 = 0.7303$ | | |
| $r_3 = \infty$ (stop) | | | |
| | $d_3 = 0.0357$ | | |
| $r_4 = 3.2498$ | | | |
| | $d_4 = 1.4366$ | $n_2 = 1.56384$ | $\nu_2 = 60.69$ |
| $r_5 = -1.1668$ (aspherical surface) | | | |
| | $d_5 = 0.5248$ | | |
| $r_6 = 2.0941$ | | | |
| | $d_6 = 2.8941$ | $n_3 = 1.56873$ | $\nu_3 = 63.16$ |
| $r_7 = \infty$ | | | |

| aspherical surface coefficient |
|---|
| P = −0.0292, B = 0, E = 0, F = 0, G = 0, H = 0, I = 0 |
| $E_i' = 8.099 \times 10^{-2}$, $F_i' = 2.888 \times 10^{-2}$ |
| $G_i' = 1.327 \times 10^{-2}$, $H_i' = 6.822 \times 10^{-3}$ |
| $I_i' = 3.758 \times 10^{-3}$ |
| $f_1/f = -1.332$, $f_2/f = 1.725$ |
| $E_i' (n_{i-1} - n_i) \cdot f^3 = 0.04566$, |
| $F_i' (n_{i-1} - n_i) \cdot f^5 = 0.01628$ |
| $\Delta x(h_M)(n_{i-1} - n_i)/f = 0.00383$, $d_2/r_2 = 0.621$ |
| $|f_{23}/f_1| = 1.035$, $f_3/f_2 = 2.134$, $|\beta_E| = 7.687$ |

Embodiment 7 f = 1.000, F number = 2.018
image height = 0.8798, field angle = 120°
object distance = −21.1160

| | | | |
|---|---|---|---|
| $r_1 = \infty$ | | | |
| | $d_1 = 0.4106$ | $n_1 = 1.51633$ | $\nu_1 = 64.15$ |
| $r_2 = 0.7180$ | | | |
| | $d_2 = 0.8868$ | | |
| $r_3 = \infty$ (stop) | | | |
| | $d_3 = 0.0352$ | | |
| $r_4 = -38.5826$ | | | |
| | $d_4 = 1.3977$ | $n_2 = 1.69680$ | $\nu_2 = 55.52$ |
| $r_5 = -1.4502$ | | | |
| | $d_5 = 0.6134$ | | |
| $r_6 = 1.7830$ (aspherical surface) | | | |
| | $d_6 = 3.2926$ | $n_3 = 1.56384$ | $\nu_3 = 60.69$ |
| $r_7 = \infty$ | | | |

| aspherical surface coefficient |
|---|
| P = 1.0000, B = 0, E = −0.45716 × 10⁻¹, F = 0.18584 × 10⁻¹ |
| G = −0.85050 × 10⁻², H = 0, I = 0 |
| $f_1/f = -1.391$, $f_2/f = 2.130$ |
| $E_i' (n_{i-1} - n_i) \cdot f^3 = 0.02578$, |
| $F_i' (n_{i-1} - n_i) \cdot f^5 = -0.01048$ |
| $\Delta x(h_M)(n_{i-1} - n_i)/f = 0.00162$, $d_2/r_2 = 1.235$ |
| $|f_{23}/f_1| = 1.028$, $f_3/f_2 = 1.485$, $|\beta_E| = 8.111$ |

Embodiment 8 f = 1.000, F number = 2.029
image height = 0.8794, field angle = 120°
object distance = −21.1057

| | | | |
|---|---|---|---|
| $r_1 = \infty$ | | | |
| | $d_1 = 0.4104$ | $n_1 = 1.51633$ | $\nu_1 = 64.15$ |
| $r_2 = 0.7121$ | | | |
| | $d_2 = 0.7354$ | | |
| $r_3 = \infty$ (stop) | | | |
| | $d_3 = 0.0352$ | | |
| $r_4 = 4.2851$ | | | |
| | $d_4 = 1.4181$ | $n_2 = 1.56384$ | $\nu_2 = 60.69$ |
| $r_5 = -1.1000$ (aspherical surface) | | | |
| | $d_5 = 0.6625$ | | |
| $r_6 = 1.7699$ | | | |
| | $d_6 = 1.6670$ | $n_3 = 1.56873$ | $\nu_3 = 63.16$ |
| $r_7 = -2.4975$ | | | |
| | $d_7 = 1.0989$ | $n_4 = 1.84666$ | $\nu_4 = 23.78$ |
| $r_8 = \infty$ | | | |

| aspherical surface coefficient |
|---|
| P = 0.2410, B = 0, E = 0, F = 0, G = 0, H = 0, I = 0 |
| $E_i' = 7.128 \times 10^{-2}$, $F_i' = 3.655 \times 10^{-2}$ |
| $G_i' = 1.976 \times 10^{-2}$, $H_i' = 1.156 \times 10^{-2}$ |
| $I_i' = 7.182 \times 10^{-3}$ |
| $f_1/f = -1.379$, $f_2/f = 1.715$ |
| $E_i' (n_{i-1} - n_i) \cdot f^3 = 0.04019$, |
| $F_i' (n_{i-1} - n_i) \cdot f^5 = 0.02061$ |
| $\Delta x(h_M)(n_{i-1} - n_i)/f = 0.00359$, $d_2/r_2 = 1.033$ |
| $|f_{23}/f_1| = 0.936$, $f_3/f_2 = 2.350$, $|\beta_E| = 5.935$ |

Embodiment 9 f = 1.000, F number = 2.029
image height = 0.6539, field angle = 80°
object distance = −13.0776

| | | | |
|---|---|---|---|
| $r_1 = \infty$ | | | |
| | $d_1 = 0.3632$ | $n_1 = 1.51633$ | $\nu_1 = 64.15$ |
| $r_2 = 1.0177$ | | | |
| | $d_2 = 0.5057$ | | |
| $r_3 = \infty$ | | | |
| | $d_3 = 2.3976$ | $n_2 = 1.80610$ | $\nu_2 = 40.95$ |
| $r_4 = \infty$ (stop) | | | |
| | $d_4 = 0.7847$ | | |
| $r_5 = 12.0980$ | | | |
| | $d_5 = 0.6285$ | $n_3 = 1.56384$ | $\nu_3 = 60.69$ |
| $r_6 = -1.7737$ (aspherical surface) | | | |
| | $d_6 = 0.2616$ | | |
| $r_7 = 2.2315$ | | | |
| | $d_7 = 3.8424$ | $n_4 = 1.56873$ | $\nu_4 = 63.16$ |
| $r_8 = \infty$ | | | |

| aspherical surface coefficient |
|---|
| P = 0.0792, B = 0, E = 0, F = 0, G = 0, H = 0, I = 0 |
| $E_i' = 2.063 \times 10^{-2}$, $F_i' = 3.538 \times 10^{-3}$ |
| $G_i' = 7.069 \times 10^{-4}$, $H_i' = 1.574 \times 10^{-4}$ |
| $I_i' = 3.752 \times 10^{-5}$ |
| $f_1/f = -1.971$, $f_2/f = 2.789$ |
| $E_i' (n_{i-1} - n_i) \cdot f^3 = 0.01163$, |
| $F_i' (n_{i-1} - n_i) \cdot f^5 = 0.00199$ |
| $\Delta x(h_M)(n_{i-1} - n_i)/f = 0.00207$, $d_2/r_2 = 1.801$ |
| $|f_{23}/f_1| = 0.868$, $f_3/f_2 = 1.407$, $|\beta_E| = 7.632$ |

Embodiment 10 f = 1.000, F number = 1.991
image height = 0.9026, field angle = 120°
object distance = −21.6617

| | | | |
|---|---|---|---|
| $r_1 = \infty$ | | | |
| | $d_1 = 0.4212$ | $n_1 = 1.51633$ | $\nu_1 = 64.15$ |
| $r_2 = 0.6991$ | | | |
| | $d_2 = 0.7590$ | | |
| $r_3 = \infty$ (stop) | | | |
| | $d_3 = 0.0361$ | | |
| $r_4 = 4.2628$ | | | |
| | $d_4 = 1.4588$ | $n_2 = 1.56384$ | $\nu_2 = 60.69$ |
| $r_5 = -1.2015$ (aspherical surface) | | | |
| | $d_5 = 0.3386$ | | |
| $r_6 = 2.4611$ | | | |
| | $d_6 = 1.4156$ | $n_3 = 1.69680$ | $\nu_3 = 55.52$ |
| $r_7 = -1.5984$ | | | |
| | $d_7 = 0.4045$ | $n_4 = 1.84666$ | $\nu_4 = 23.78$ |
| $r_8 = -6.9974$ | | | |

| aspherical surface coefficient |
|---|
| P = 0.3114, B = 0, E = 0, F = 0, G = 0, H = 0, I = 0 |
| $E_i' = 4.963 \times 10^{-2}$, $F_i' = 2.254 \times 10^{-2}$ |
| $G_i' = 1.048 \times 10^{-2}$, $H_i' = 5.191 \times 10^{-3}$ |
| $I_i' = 2.714 \times 10^{-3}$ |
| $f_1/f = -1.354$, $f_2/f = 1.839$ |
| $E_i' (n_{i-1} - n_i) \cdot f^3 = 0.02798$, |
| $F_i' (n_{i-1} - n_i) \cdot f^5 = 0.01271$ |
| $\Delta x(h_M)(n_{i-1} - n_i)/f = 0.00297$, $d_2/r_2 = 1.086$ |
| $|f_{23}/f_1| = 1.022$, $f_3/f_2 = 1.823$, $|\beta_E| = 9.061$ | wherein the reference symbols $r_1, r_2, \ldots$ represent radii of curvature on the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's number of the respective lens elements.

Figure 3:
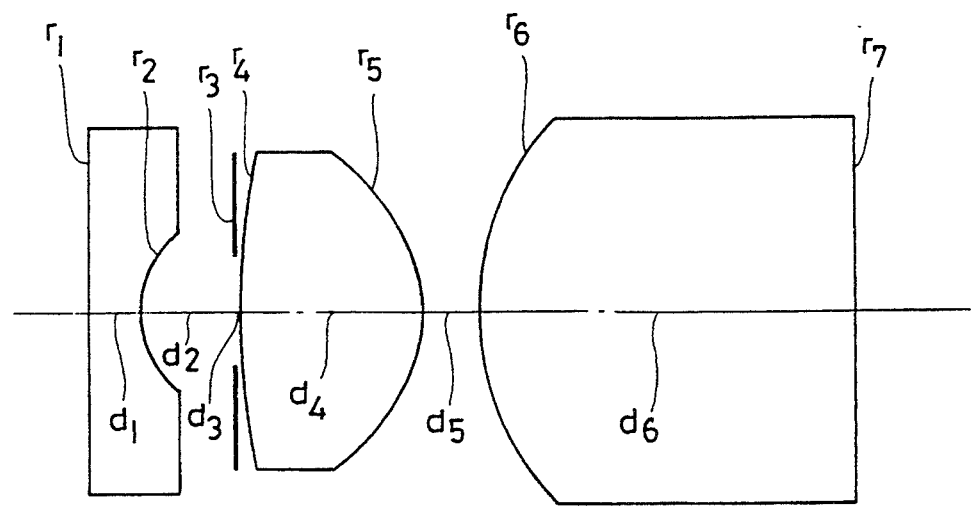
FIG. 3 shows a sectional view illustrating a composition of first through seventh embodiments of the objective lens system for endoscopes according to the present invention.

Out of the embodiments described above, the first through seventh embodiments have the composition illustrated in FIG. 3 wherein each of the first, second and third lens units is composed of a single lens element. When each of the lens units of the objective lens system is composed of a single lens element, the objective lens system comprises no factor for correcting lateral chromatic aberration and allows remarkable lateral chromatic aberration to remain therein even when the lens system has a large Abbe's number. In case of medical endoscopes, however objects to be observed therethrough are located in living bodies and emit spectra consisting mostly of warm colors, whereby image contrast is not lowered by chromatic aberration and the residual lateral chromatic aberration poses no problem in practical use. The objective lens systems preferred as the first through seventh embodiments can be manufactured at low costs since these lens systems use no cemented lens components which requires an expensive cost price and complicated procedures for cementing.

An aspherical surface is used as the image side surface of the second lens unit in each of the first through sixth embodiments, whereas an aspherical surface is adopted as the object side surface of the third lens unit in the seventh embodiment.

Figure 17:
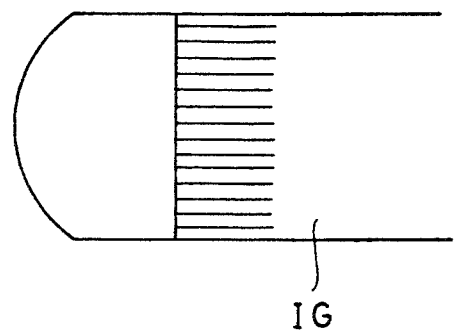
FIG. 17 shows a diagram illustrating an example of layout for the objective lens system for endoscopes according to the present invention and an image guide.
Figure 18:
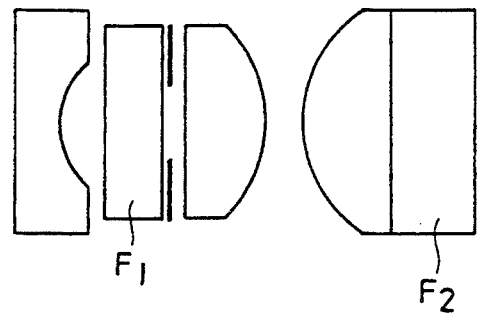
FIG. 18, FIG. 19 and FIG. 20 show sectional views exemplifying dispositions of filters in the objective lens system for endoscopes according to the present invention.
Figure 19:
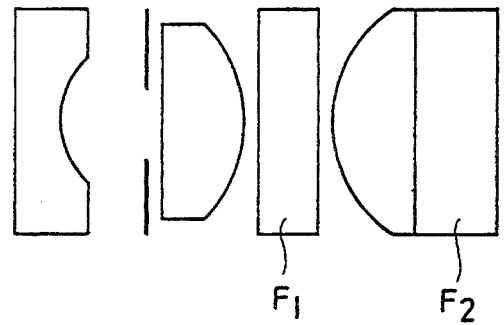
Figure 20:
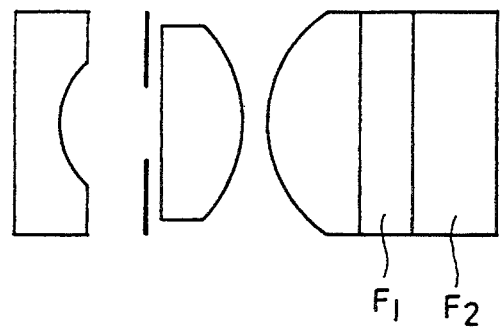

Further, the image side surface of the third lens unit is configured as a planar surface which functions as an imaging surface in each of the first through seventh embodiments. It is therefore desirable to cement the third lens unit to an end surface of an image guide IG as illustrated in FIG. 17 when the objective lens systems preferred as the first through seventh embodiments are to be used in fiber scopes. Further, when the objective lens system according to the present invention is to be used in a video scope, it is necessary to use an infrared cut off filter and, in certain cases, a quartz filter. In such cases, it is sufficient to thin the third lens unit so that the image side surface thereof is apart from the imaging surface, dispose a quartz filter $F_2$ between the third lens unit and an image pickup device, and dispose an infrared cut off filter at a location on the image side of the first lens unit as shown in FIG. 18, FIG. 19 or FIG. 20.

The first through seventh embodiments described above have aberration characteristics illustrated in FIG. 7 through FIG. 13 respectively.

Figure 4:
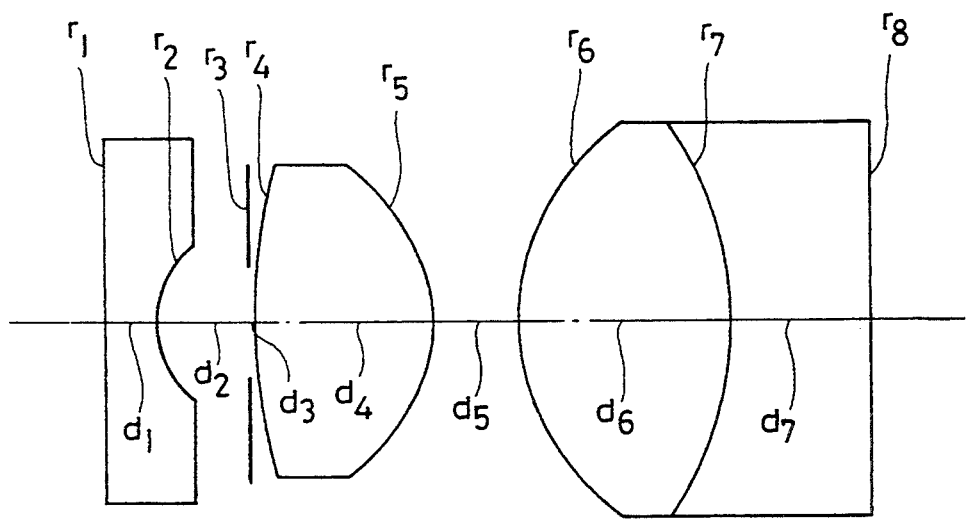
FIG. 4 shows a sectional view illustrating a composition of an eighth embodiment of the objective lens system according to the present invention.
Figure 14:
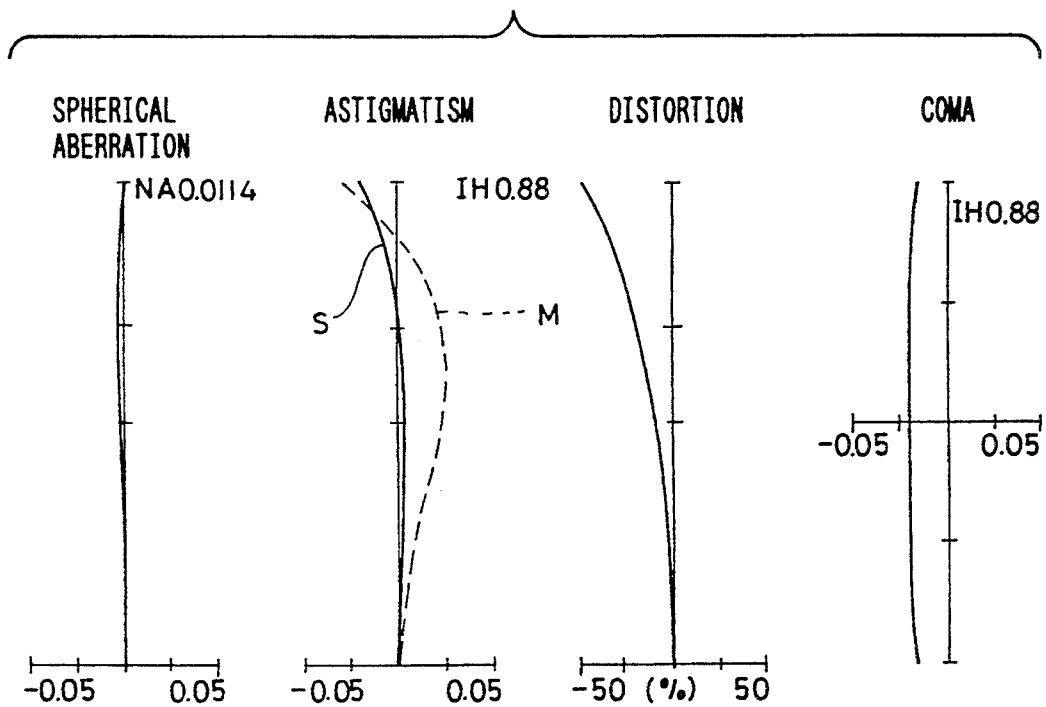

The eighth embodiment has the composition illustrated in FIG. 4 wherein the third lens unit is composed of a cemented lens component which consists of two lens elements having Abbe's numbers different from each other for correcting mainly lateral chromatic aberration. In the eighth embodiment also, the image side surface of the third lens unit is a planar surface and it is desirable to cement an end surface of an image guide to the planar surface when the objective lens system is to be used in fiber scopes. Aberration characteristics of the eighth embodiment are illustrated in FIG. 14.

Figure 5:
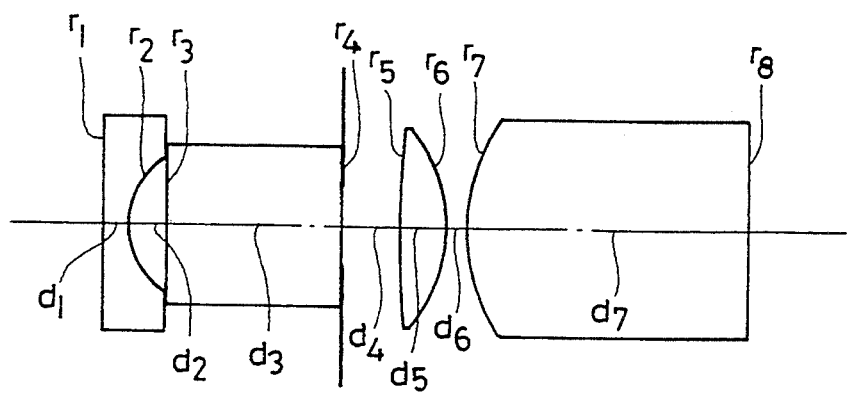
FIG. 5 shows a sectional view illustrating a composition of a ninth embodiment of the objective lens system for endoscopes according to the present invention.
Figure 15:
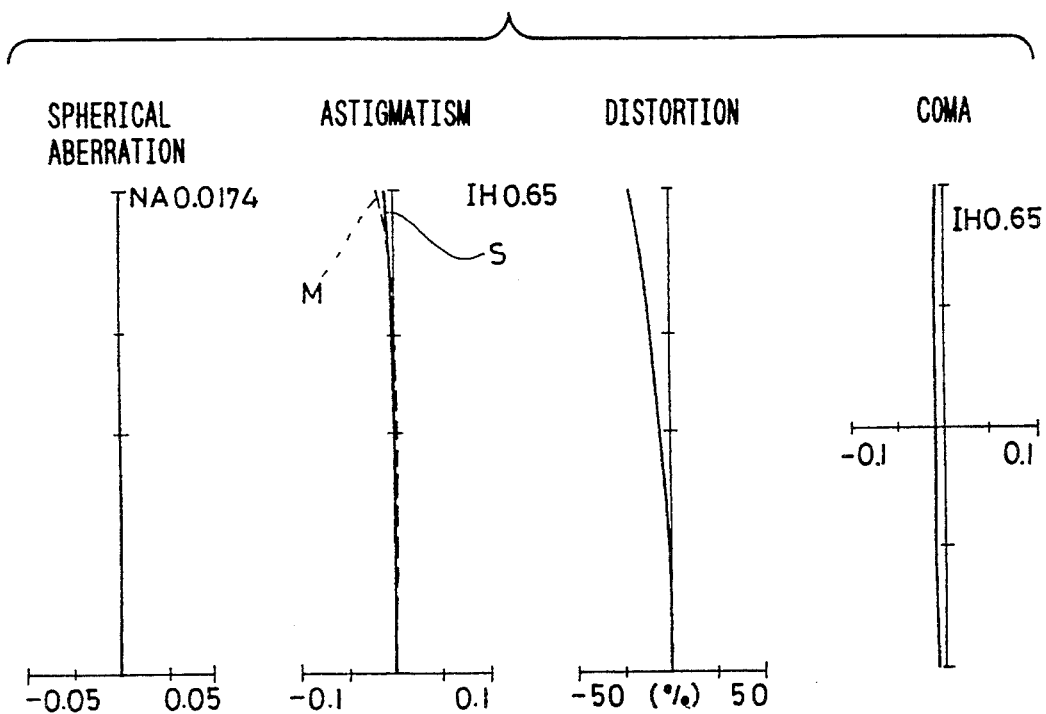

The ninth embodiment is an objective lens system which has the composition shown in FIG. 5 and is configured on an assumption that the objective lens system is to be used in endoscopes for oblique observation. The thick glass plate which is disposed between the first lens unit and the second lens unit is a prism adopted for oblique observation. In this case, an objective lens system for oblique observation of front images can be obtained by using a roof prism as the prism for oblique observation, whereas an objective lens system for oblique observation of rear images ban be obtained by using a triangular prism as the prism for oblique observation. Aberration characteristics of the ninth embodiment are visualized in FIG. 15.

Figure 6:
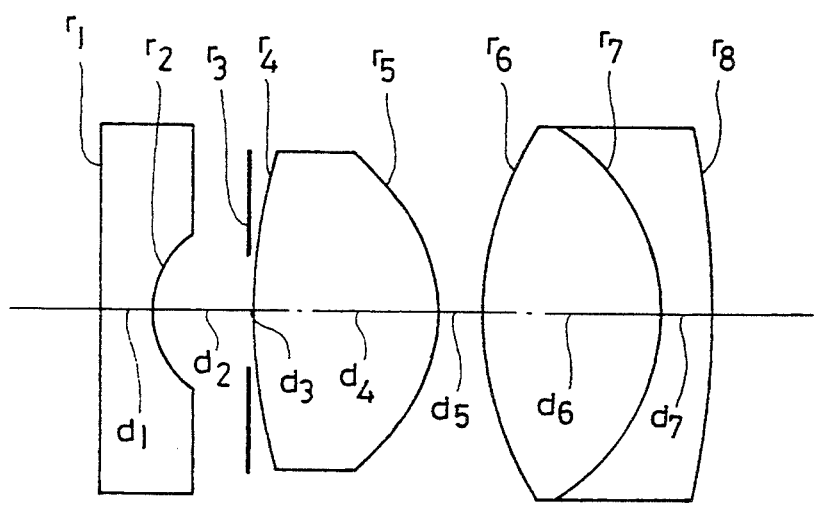
FIG. 6 shows a sectional view illustrating a composition of a tenth embodiment of the objective lens system for endoscopes according to the present invention.
Figure 7:
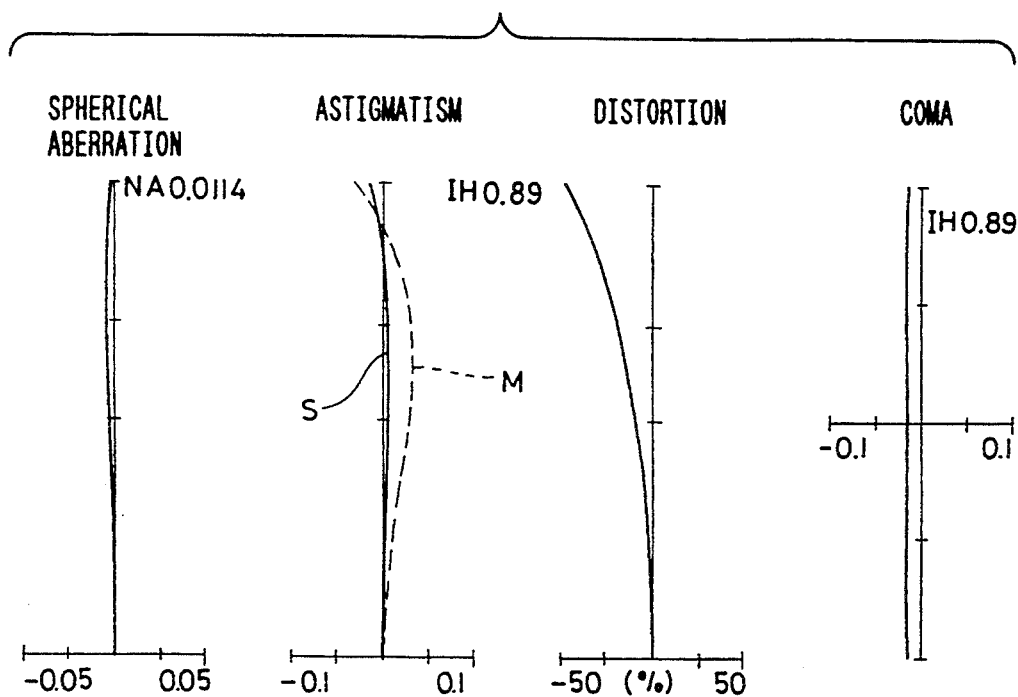
FIG. 7 through FIG. 16 show graphs illustrating aberration characteristics of the first through tenth embodiments respectively of the present invention.
Figure 8:
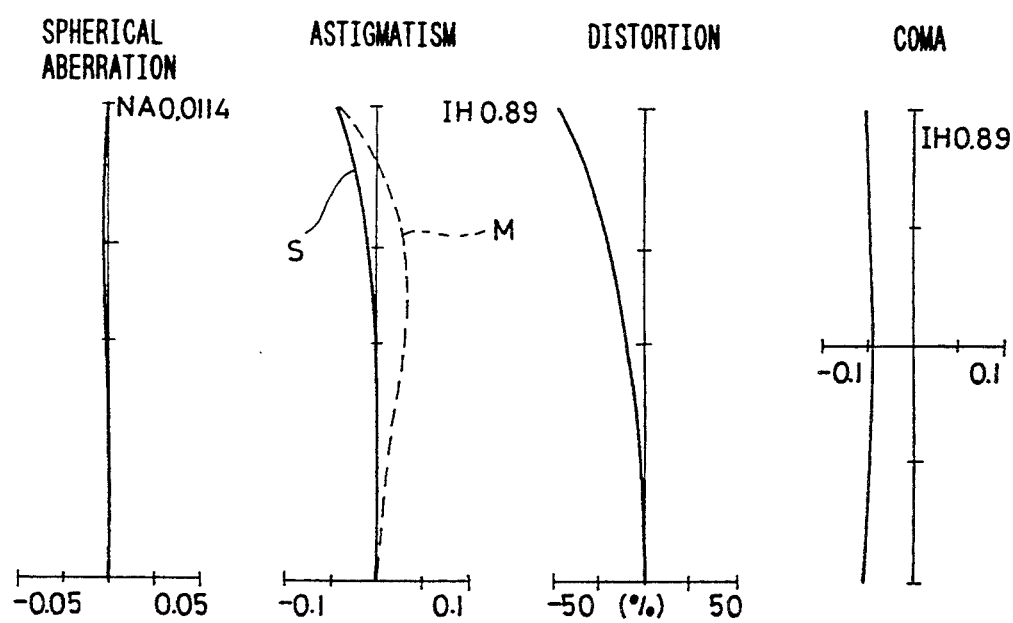
Figure 9:
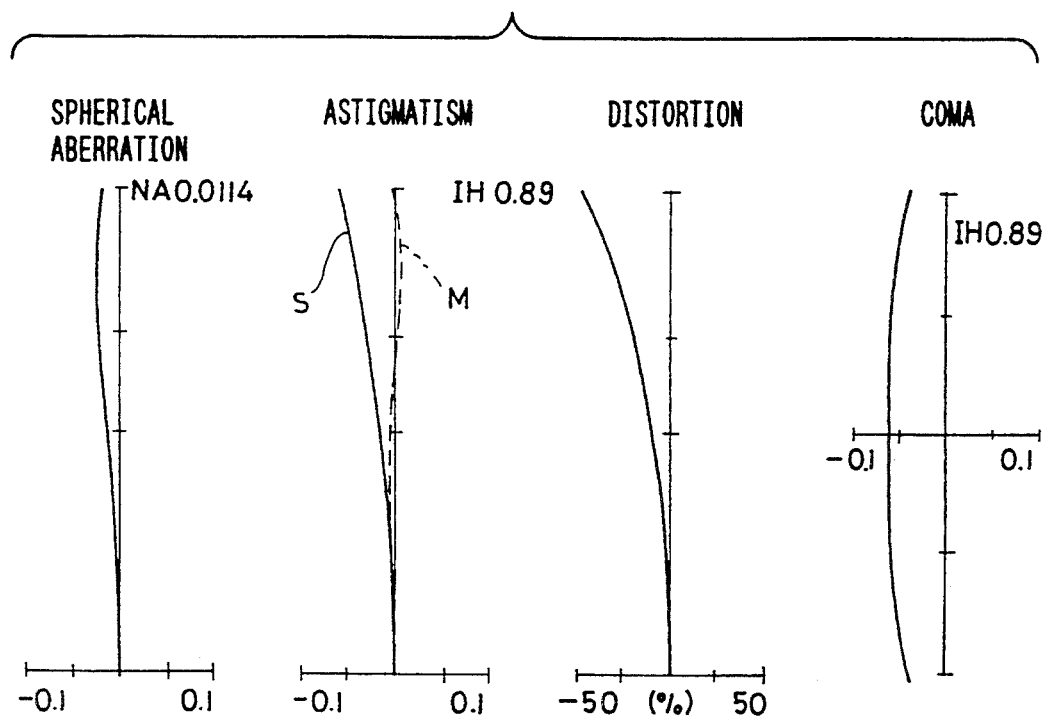
Figure 10:
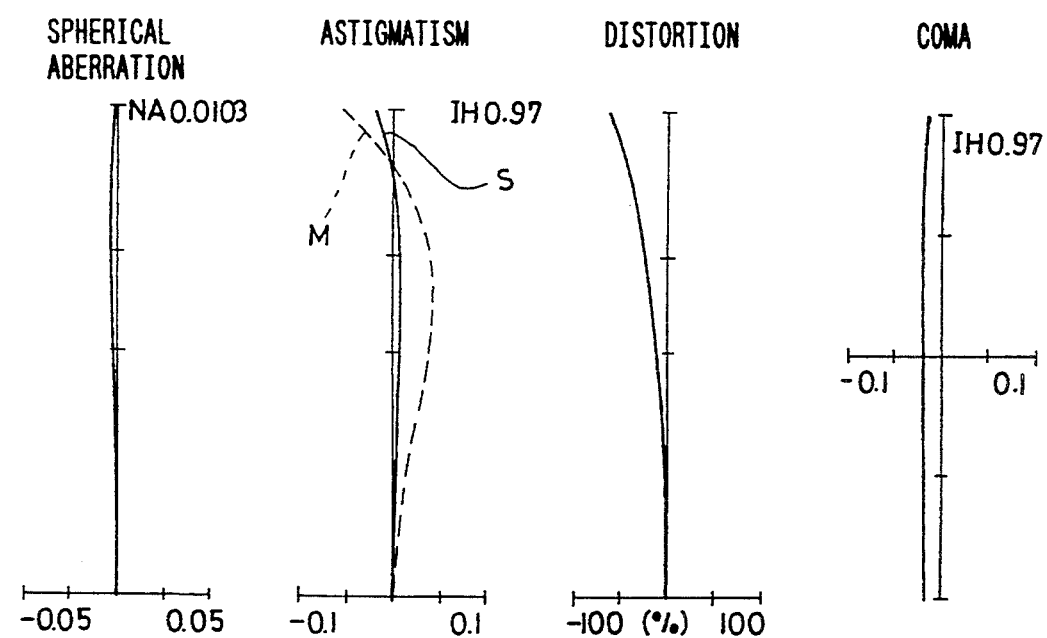
Figure 11:
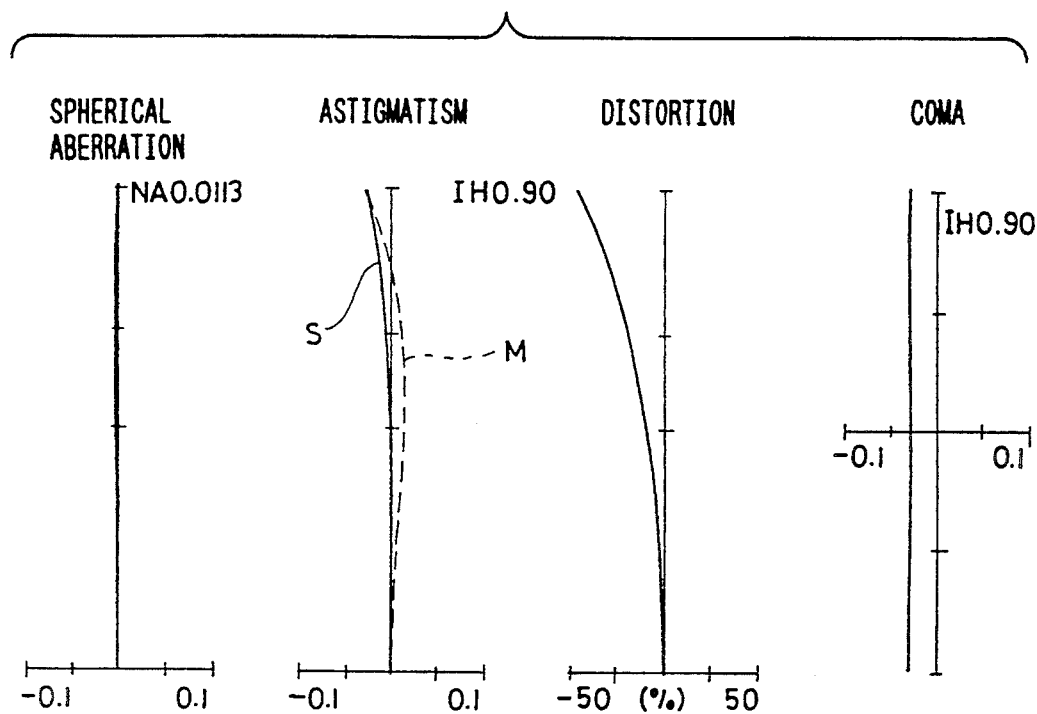
Figure 12:
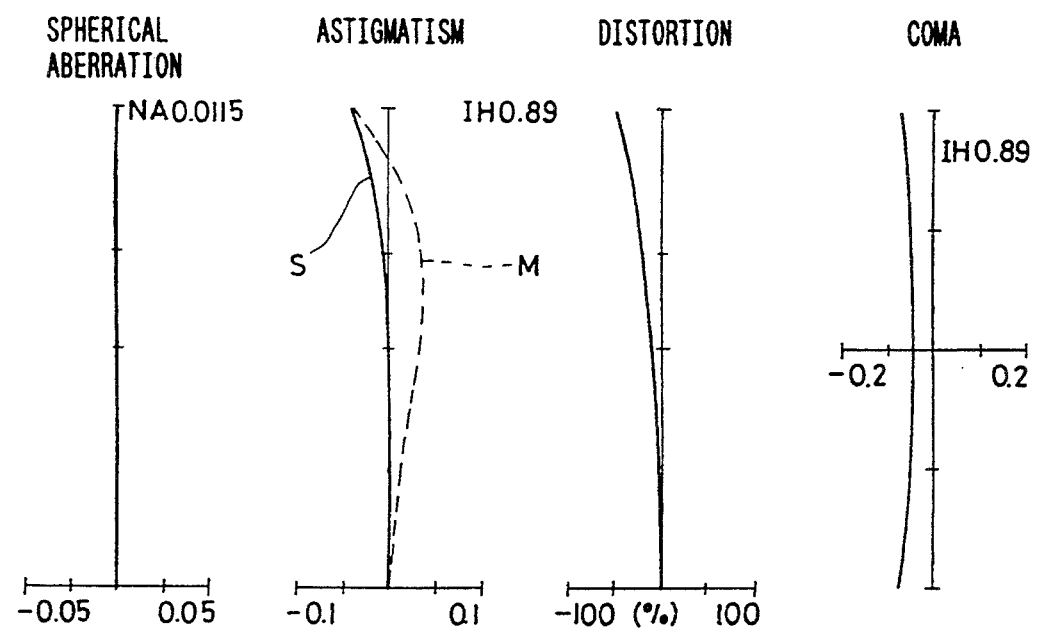
Figure 13:
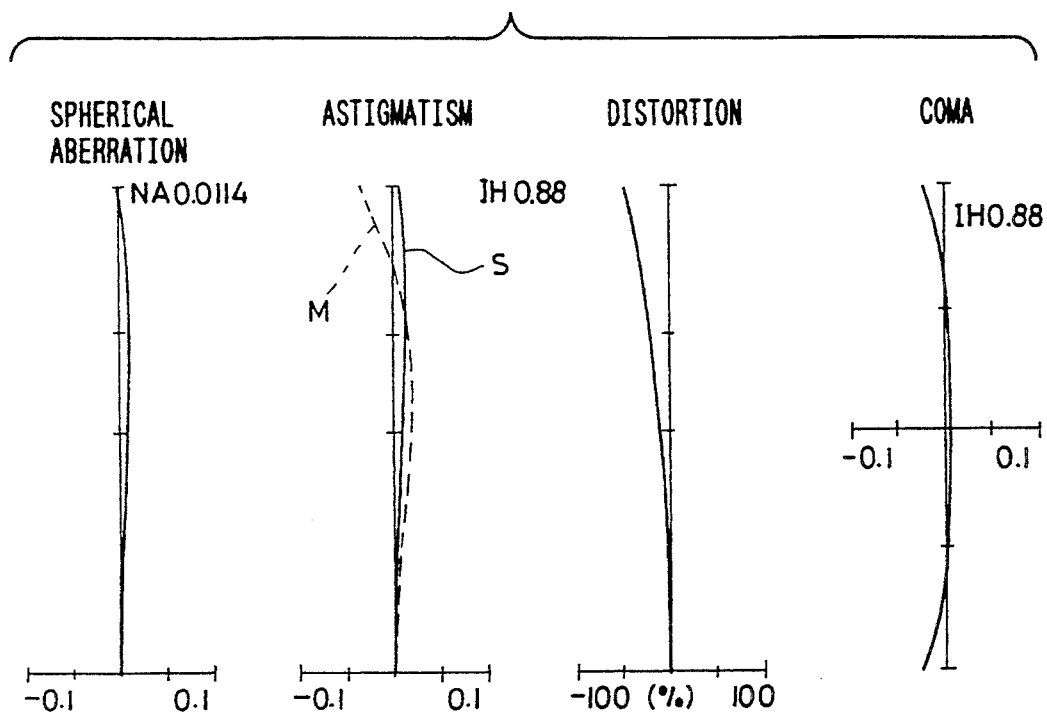
Figure 16:
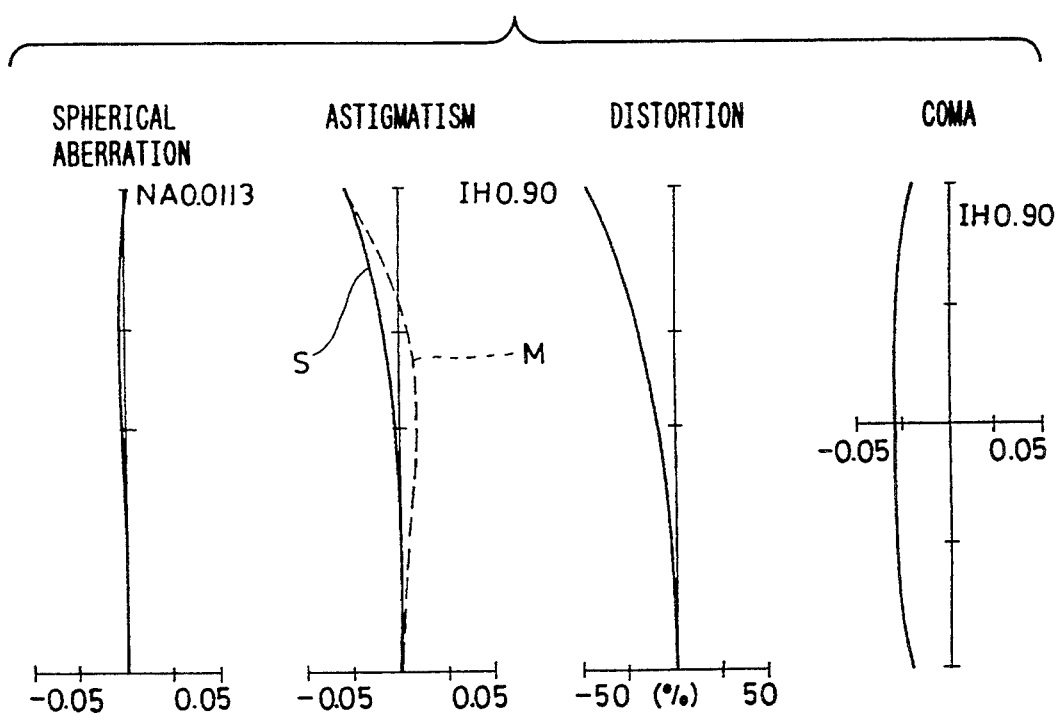

The tenth embodiment has the composition illustrated in FIG. 6, wherein the third lens unit is composed of a cemented lens component which has a curved surface on the image side for favorably correcting Seidel's five aberrations and chromatic aberration. The tenth embodiment has the aberration characteristics visualized in FIG. 16.

In all of the first through tenth embodiments described above which are objective lens systems specified for an F number of 2 for forming bright images, spherical aberration is suppressed to the order of 5% of focal lengths of the objective lens systems, and coma and astigmatism are corrected favorably.

As is understood from the foregoing description, the objective lens system for endoscopes according to the present invention comprises four or less lens elements, and nevertheless has an F number on the order of 2 for forming bright images and favorably corrected curvature of field as well as spherical aberration, coma, astigmatism, etc. which are also corrected favorably.

I claim:

1. An objective lens system for endoscopes comprising, in order from the object side:
   a first lens component being a single lens having a negative refractive power,
   an aperture stop,
   a second lens component being a single lens having a positive refractive power disposed adjacent to said aperture stop, and
   a third lens component being a single lens having a positive refractive power;
   wherein an image side surface of said second lens component is an aspherical surface having a shape expressed by the formula shown below when the direction of the optical axis is taken as the x axis and the direction perpendicular to the optical axis is taken as the y axis, and wherein said objective lens system satisfies the following conditions (1) through (3):

$$x = \frac{y^2/r_i'}{1 + \sqrt{1 - (y/r_i')^2}} + E_i' y^4 + F_i' y^6 + G_i' y^8 + \ldots$$

wherein the reference symbol $f_{23}$ represents a total focal length of the second lens component and the third lens component, the reference symbols $f_1, f_2$ and $f_3$ designate focal lengths of the first lens component, the second lens component and the third lens component, respectively, the reference symbol $r_i$, denotes a radius of curvature on a reference sphere of the aspherical surface, the reference symbols $E_i', F_i', G_i', \ldots$ represent aspherical surface coefficients of the fourth, sixth, eighth, ... orders respectively, and the reference symbols $n_{i-1}$ and $n_i$ designate refractive indices of media located on the object side and the image side respectively of the aspherical surface.

2. An objective lens system comprising, in order from the object side:
   a first lens component being a single lens having a negative refractive power,
   an aperture stop,
   a second lens component being a single lens having a positive refractive power disposed adjacent to said aperture stop, and
   a third lens component being a single lens having a positive refractive power;
   wherein an image side surface of said second lens component is an aspherical surface, and
   wherein said objective lens system satisfies the following conditions (1), (2) and (7):

$0.4 < |f_{23}/f_1| < 2$     (1)

$0.8 < f_3/f_2 < 4$     (2)

$\Delta x \, (h_M) \cdot (n_{i-1} - n_i) > 0$     (3)

wherein the reference symbol $f_{23}$ represents a total focal length of the second lens component and the third lens component, the reference symbols $f_1$, $f_2$ and $f_3$ designate focal lengths of the first lens component, the second lens component, and the third lens component, respectively, the reference symbol $\Delta x \, (h_M)$ denotes a departure of the aspherical surface from a reference sphere at a height of a marginal ray on said aspherical surface, and the reference symbols $n_{i-1}$ and $n_i$ represent refractive indices of media located on the object side and the image side respectively of said aspherical surface.

3. An objective lens system for endoscopes comprising, in order from the object side:
   a first lens component being a plano-concave lens,
   an aperture stop,
   a second lens component being a biconvex lens disposed adjacent to said aperture stop, and
   a third lens component being a positive single lens, having an objective side being a convex surface;
   wherein an image side surface of said second lens component is an aspherical surface having a shape expressed by the formula shown below when the direction of the optical axis is taken as the x axis and the direction perpendicular to the optical axis is taken as the y axis, and wherein said objective lens system satisfies the following conditions (1) through (3):

$$x = \frac{y^2/r_i'}{1 + \sqrt{1 - (y/r_i')^2}} + E_i' y^4 + F_i' y^6 + G_i' y^8 + \ldots$$

$0.4 < |f_{23}/f_1| < 2$     (1)

$0.8 < f_3/f_2 < 4$     (2)

$E_i', (n_{i-1} - n_i) > 0$     (3)

wherein the reference symbol $f_{23}$ represents a total focal length of the second lens component and the third lens component, the reference symbols $f_1$, $f_2$ and $f_3$ designate focal lengths of the first lens component, the second lens component and the third lens component, respectively, the reference symbol $r_i$ denotes a radius of curvature on a reference sphere of the aspherical surface, the reference symbols $E_i', F_i', G_i' \ldots$ represent aspherical surface coefficients of the fourth, sixth, eighth . . . orders respectively, and the reference symbols $n_{i-1}$ and $n_i$ designate refractive indices of media located on the object side and the image side, respectively, of the aspherical surface.

4. An objective lens system comprising, in order from the object side:
   a first lens component being a plano-concave lens,
   an aperture stop,
   a second lens component being a biconvex lens disposed adjacent to said aperture stop and a third lens component being a positive single lens, having an object side being a convex surface;
   wherein an image side surface of said second lens component is an aspherical surface, and wherein said objective lens system satisfies the following conditions (1), (2) and (7):

$0.4 < |f_{23}/f_1| < 2$     (1)

$0.8 < f_3/f_2 < 4$     (2)

$\Delta x \, (h_M) \cdot (n_{i-1} - n_i) > 0$     (3)

wherein the reference symbol $f_{23}$ represents a total focal length of the second lens component and the third lens component, the reference symbols $f_1$, $f_2$ and $f_3$ designate focal lengths of the first lens component, the second lens component, and the third lens component, respectively, the reference symbol $\Delta x \, (h_M)$ denotes a departure of the aspherical surface from a reference sphere at a height of $h_M$ of a marginal ray on said aspherical surface, and the reference symbols $n_{i-1}$ and $n_i$ represent refractive indices of media located on the object side and the image side respectively of said aspherical surface.

5. An objective lens system for endoscopies according to claim 1, 2, 3 or 4 satisfying the following conditions (8) to (10):

$0.4 < d_2/r_2 < 2.5$     (8)

$|f_1/f| < 2.3$     (9)

$f_2/f < 3.5$     (10)

wherein the reference symbol $d_2$ represents a distance in terms of air as measured from an image side surface of said first lens component to said aperture stop, the reference symbol $r_2$ designates a radius of curvature on the image side surface of said first single lens component and the reference symbol $f$ denotes a focal length of said objective lens system as a whole.

6. An objective lens system for endoscopes according to claim 5 satisfying the following condition (11):

$|\beta_E| > 2.5$     (11)

wherein the reference symbol $\beta_E$ represents a paraxial pupil magnification of said objective lens system.

7. An objective lens system for endoscopes according to claim 6 satisfying the following condition (4):

$0.001 < E_i'(n_{i-1} - n_i) \cdot f^3 < 0.2.$     (4)

8. An objective lens system for endoscopes according to claim 7 satisfying the following condition (5):

$F_i' \cdot (n_{i-1} - n_i) > 0$     (5)

wherein the reference symbol $F_i'$, represents an aspherical surface coefficient of the sixth order of the aspherical surface.

* * * * *

UNITED STATES PATENT AND TRADEMARK OFFICE
CERTIFICATE OF CORRECTION

PATENT NO. : 5,418,649

DATED : May 23, 1995

INVENTOR(S) : IGARASHI

It is certified that error appears in the above-indentified patent and that said Letters Patent is hereby corrected as shown below:

Column 14, after the equation:

$$"x = \frac{y^2/r_i}{1+\sqrt{1-(y/r_i)^2}} + E'_i y^4 + F'_i y^6 + G'_i y^8 + \ldots"$$

insert the following three conditions:

$$-- 0.4 < |f_{23}/f_1| < 2 \qquad (1)$$

$$0.8 < f_3/f_2 < 4 \qquad (2)$$

$$E'_i (n_{i-1} - n_i) > 0 \qquad (3) --$$

UNITED STATES PATENT AND TRADEMARK OFFICE
CERTIFICATE OF CORRECTION

PATENT NO. : 5,418,649
DATED : May 23, 1995
INVENTOR(S) : IGARASHI

It is certified that error appears in the above-indentified patent and that said Letters Patent is hereby corrected as shown below:

Column 14, line 61, change "$r_i$," to --$r_i'$--,

Column 15, line 19, change the third listed condition to:

$$-- \Delta x(h_M) \cdot (n_{i-1} - n_i) > 0 \qquad (3) --$$

Signed and Sealed this

Thirteenth Day of February, 1996

Attest:

BRUCE LEHMAN

*Attesting Officer*    Commissioner of Patents and Trademarks